United States Patent
Natanzon

(10) Patent No.: US 9,336,230 B1
(45) Date of Patent: *May 10, 2016

(54) FILE REPLICATION

(71) Applicant: EMC Corporation, Hopkinton, MA (US)

(72) Inventor: Assaf Natanzon, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,084

(22) Filed: May 7, 2015

Related U.S. Application Data

(63) Continuation of application No. 13/338,808, filed on Dec. 28, 2011, now Pat. No. 9,031,913.

(51) Int. Cl.
*G06F 17/30* (2006.01)
*G06F 3/06* (2006.01)

(52) U.S. Cl.
CPC .......... *G06F 17/30174* (2013.01); *G06F 3/061* (2013.01); *G06F 3/067* (2013.01); *G06F 3/0659* (2013.01); *G06F 17/30088* (2013.01); *G06F 17/30212* (2013.01)

(58) Field of Classification Search
None
See application file for complete search history.

(56) References Cited

U.S. PATENT DOCUMENTS

| | | | |
|---|---|---|---|
| 2006/0047713 A1* | 3/2006 | Gornshtein | G06F 17/30575 |
| 2008/0162840 A1* | 7/2008 | Augenstein | G06F 11/1471 |
| | | | 711/161 |
| 2011/0071981 A1* | 3/2011 | Ghosh | G06F 11/2025 |
| | | | 707/634 |

\* cited by examiner

*Primary Examiner* — Amresh Singh
(74) *Attorney, Agent, or Firm* — Krishnendu Gupta; Joseph D'Angelo

(57) ABSTRACT

A method, system, and computer program product for use in replication comprising intercepting an IO for a file at an application layer at the production site, determining if the file is being replicated, and based on a determination the file is being replicated, sending the IO to a first data recovery appliance and recording the IO in a journal.

14 Claims, 16 Drawing Sheets

1200

| bit→<br>↓byte | 7 | 6 | 5 | 4 | 3 | 2 | 1 | 0 |
|---|---|---|---|---|---|---|---|---|
| 0 | Operation code = 8Ah ||||||||
| 1 | | WRProtect || DPO | FUA | Reserved | FUA_NV | Obsolete |
| 2-9 | LBA ||||||||
| 10-13 | Transfer Length ||||||||
| 14 | Restricted for MMC-6 | Reserved ||| Group Number ||||
| 15 | Control ||||||||

Figure 12

FILE REPLICATION

RELATED APPLICATIONS

This Application is a Continuation of U.S. patent application Ser. No. 13/338,808 filed on Dec. 28, 2011 now U.S. Pat. No. 9,031,913, the content and teachings of which are hereby incorporated by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product for use in replication comprising intercepting an IO for a file at an application layer at the production site, determining if the file is being replicated, and based on a determination the file is being replicated, sending the IO to a first data recovery appliance and recording the IO in a journal.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 12 is a simplified illustration of a sample header of a SCSI WRITE(16) command, in accordance with an embodiment of the present disclosure;

DETAILED DESCRIPTION

Figure 1:
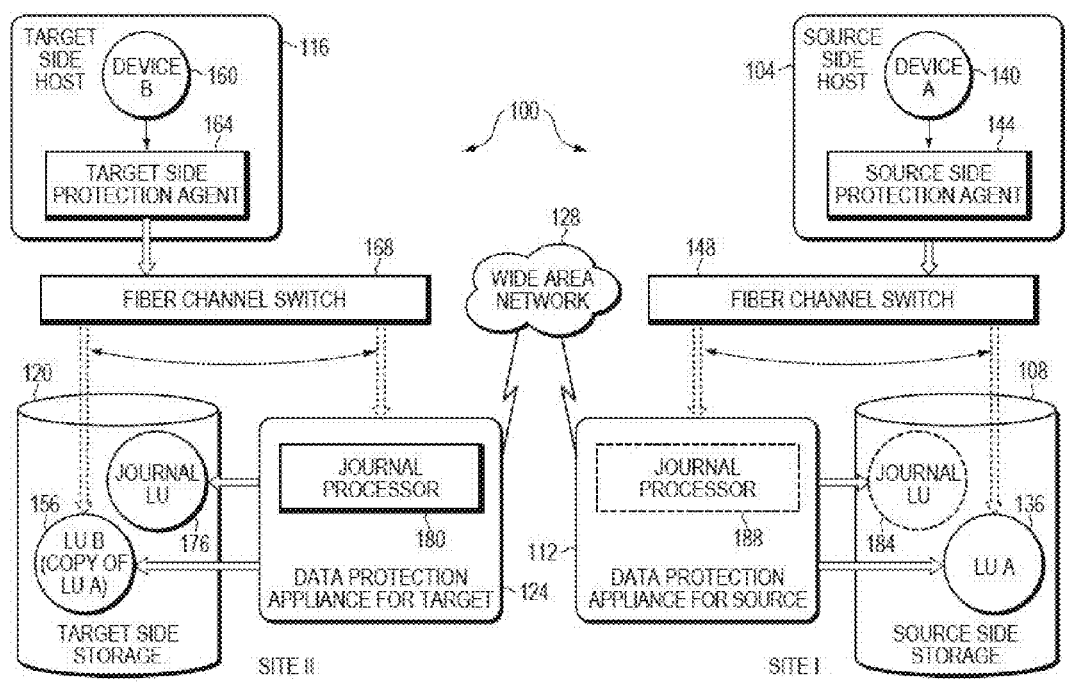
FIG. 1 is a simplified illustration of a data protection system, in accordance with an embodiment of the present disclosure.

Typically, replication is performed at a file system level. Generally, a replication system may have a splitter inserted in the SCSI stack and replication may capture IO at this level. However, conventional techniques may not be able to capture replication at the file level. Usually, this may be because IO at the SCSI level may be directed at the block level and may not contain information relating to the file level. Generally, when a Virtual Machine is being run, the virtual machine storage may be represented as one or more files, each file may represent a virtual disk. Thus, current techniques are not usually able to replicate a VM without replicating the whole system running the VM, which may include multiple VMs.

In an embodiment of the current disclosure, replication is enabled at the file level. In certain embodiments, a splitter may be added in the file system stack of the production site. In some embodiments, IO sent to the file may be replicated. In other embodiments, commands to create a file may be replicated. In at least some embodiments, commands to decrease the size of a file may also be replicated. In certain embodiments, commands to increase the size of a file may also be replicated. In further embodiments, commands to delete a file may be replicated. In most embodiments, commands to create a file may be replicated. In still further embodiments, commands to rename a file may be replicated. In certain embodiments, where the splitter is located in the file system stack, the IO may be transmitted over and HBA over a fiber channel protocol. In other embodiments, the file IO may be transmitted over IP. In further embodiments, the IO may be transmitted over a fiber channel or over IP between the production and replication site. In certain embodiments, there may be two mediums between the host and the Data Protection Appliance (DPA) and between the two DPAs. In most embodiments, between the DPAs, communication may be performed with Internet Protocol (IP) and communication between the host and DPA may use fiber channel.

In certain embodiments, when a write is intercepted at the splitter, the splitter may communicate the IO to the replication appliance. In some embodiments, the splitter may communicate over IP. In other embodiments, the replication appliance may expose a SCSI device and splitter may write to the SCSi device. In some embodiments, the write may be intercepted at the file system transmit at the SCSI fiber channel protocol.

In most embodiments, the replication appliance may be a SAN device and may expose a LUN, the splitter sends the data arriving to a file and metadata of the file, encapsulated in an IO to the LUN exposed by the replication appliance. In certain embodiments, the appliance may send the IO to a remote replication appliance. In most embodiments, splitter may determine if the IO is to be replicated and if so the splitter may send the IO to both the appliance and down the file system IO stack. In further the remote replication appliance may write the IO into a journal. In further embodiments, the IO may be written to the journal, an undo of the IO may be created from the file, the undo may be written to an undo journal and then the data may be, then may be applied to the file.

In certain embodiments, it may be necessary to determine if a file is being replicated. In some embodiments all files of a certain type, such as *.vhd files may be replicated. In other embodiments, one or more filters may be applied to determine what file may be replicated. In further embodiments, a set of logic may be applied to determine what files may be replicated.

The following definitions are employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the 10.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands.

Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
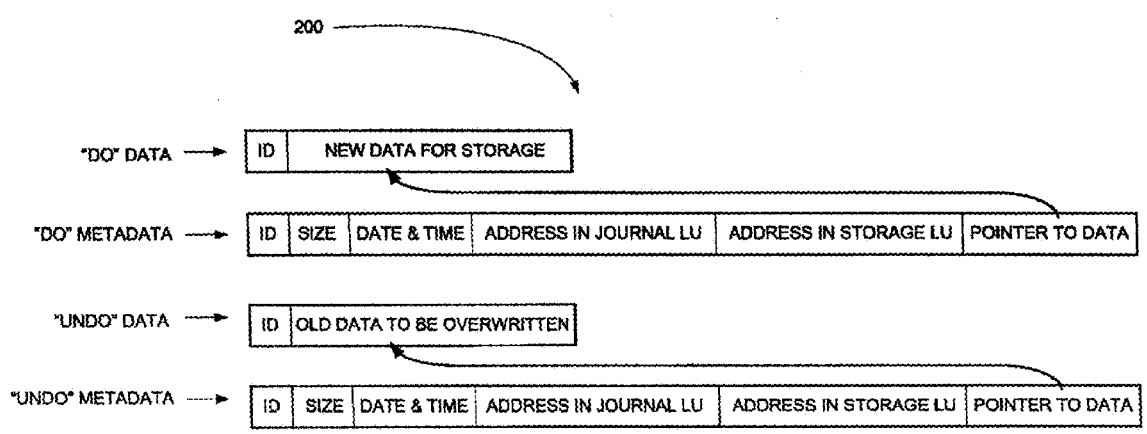
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:

one or more identifiers;

a time stamp, which is the date & time at which the transaction was received by source side DPA 112;

a write size, which is the size of the data block;

a location in journal LU 176 where the data is entered;

a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g., DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replication site to the replica.

File Level Replication

In certain embodiments, replication may also be performed at a file level. In some embodiments, the one or more of the five phase distribution may be applied to replication at a file level. In certain embodiments, this may occur by placing a splitter in an application layer of a host or production site. The application layer splitter may split file IO and file IO commands to a replication device. For simplicity in the examples given herein, in the specification, and in the Figures, file IO and file IO commands, such as create file, delete file, increase file size, and decrease file size, and file write, may be referred to interchangeable.

In most embodiments, the commands into two types, control commands such as create, delete, truncate file size, increase file size and write commands. In certain embodiments, write commands may be sent through SCSI writes to the DPA. In these embodiments, DPA may expose a LUN for accepting IO commands, every file replicated may have an ID and the file ID may be encapsulated at the CDB of the write the splitter sends to the DPA. In certain embodiments, control commands for a file may be sent by encapsulating a special control ID in the CDB (for instance offset 0 of the LUN expose by the DPA may be the control IO), and may have the control data in the payload of the control command. In some embodiments, a splitter may send SCSI WRITE(16) commands to a DPA, and may encapsulate IDs at the most significant bits of the offset (24 bits). In further embodiments, this encapsulation may allow replication of up to 16 million files through one LU exposed by the DPA.

Figure 3:
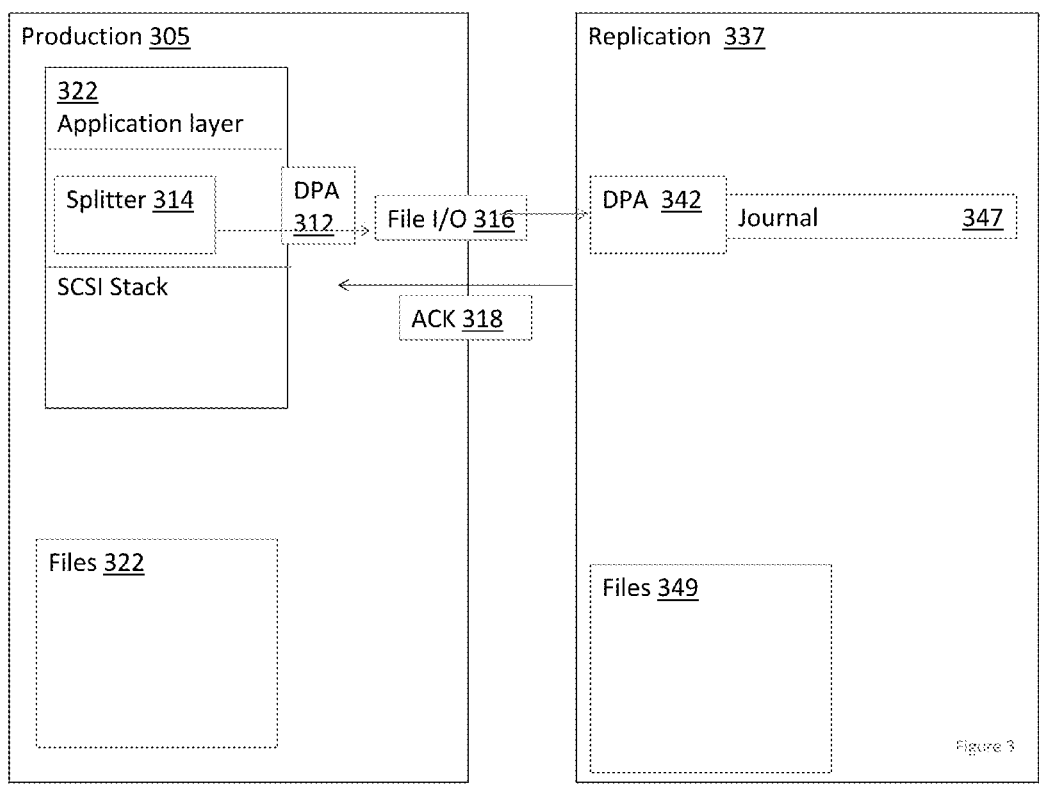
FIG. 3 is a simplified illustration of a production site and a data replication site, in accordance with an embodiment of the present disclosure.
Figure 4:
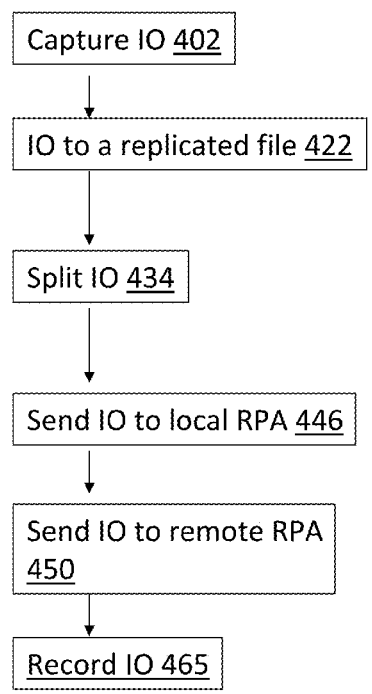
FIG. 4 is an example of an embodiment of a method for splitting IO to a replicated file, in accordance with an embodiment of the present invention.

Refer now to the example embodiment of FIGS. 3 and 4, which illustrate an example embodiment of replication at the file level. In the example embodiment of FIG. 3, files on production site 305 may be replicated to replication site 337. Splitter 314 is placed in the application layer of host 322. Splitter 314 intercepts IO (step 402). The splitter determines if the IO is to be replicated (step 422). Splitter 314 splits the IO (step 434). Splitter 314 sends IO to DPA 312 (step 446). DPA sends the IO to DPA 342 (step 450). DPA 342 records the IO (step 465) in journal 347 splitter 314 may also send file IO down the IO stack of the host.

Figure 5:
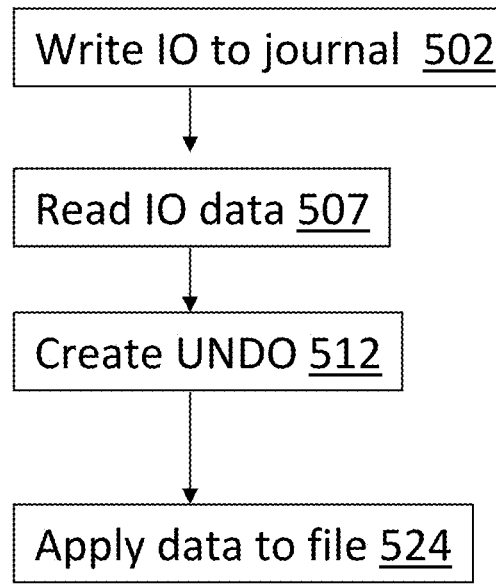
FIG. 5 is an example of an embodiment of a method for replicating splitting IO of a replicated file, in accordance with an embodiment of the present invention.

Refer now to the example embodiments of FIGS. 3 and 5, which illustrate an example embodiment of the replicated file data being written to a journal. Splitter 314 writes IO to the end of the redo journal 347 (step 502). Splitter reads the IO data from the beginning of the redo journal (step 507). An undo of the IO is created (step 512). The undo is written to an undo journal and the IO is applied to the file (step 524).

Figure 6:
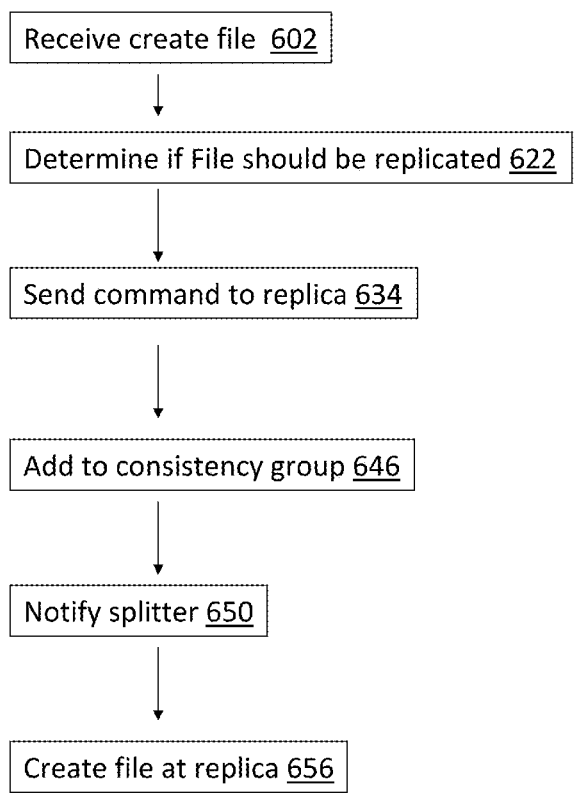
FIG. 6 is an example of an embodiment of a method for replicating a create file command for a replicated file, in accordance with an embodiment of the present invention.

Refer now to the example embodiments of FIGS. 3 and 6, which illustrate an example embodiment of replicating a command to create a file. An IO is received to create a file at the splitter (step 602). A determination is made if the file should be replicated (step 622). If the file should be replicated, the create file command may be sent to the local data protection appliance and the splitter may assign a free file ID for the file. The local data replication appliance sends the command to the remote data replication appliance (step 634). The file is added to the consistency group (step 646), and the mapping between the file ID and the file name may be save by the DPA. In certain embodiments, if the splitter crashes, the splitter up restart may get the ID to filename, database from the DPA or may maintain database.

The DPA may associate the create ID for with file name and may start accepting IOs for the file (step 650). In most embodiments, when a write IO to a new file arrives, the splitter may encapsulate the ID of the in the SCSI CDB of the command the splitter sends to the DPA. The file is created at the replica file system, and in some embodiments the directory path, when an IO describing the creation of the file is applied from journal 347 (step 656). In certain embodiments, such as those with virtual environments, files may not be created frequently and may not be created in great numbers.

Figure 7:
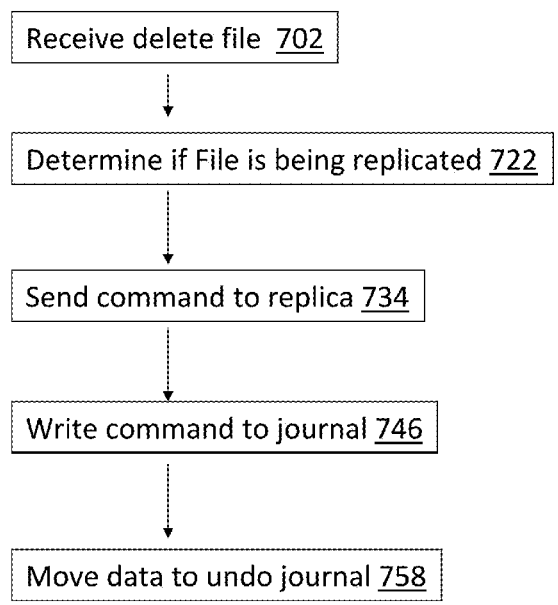
FIG. 7 is an example of an embodiment of a method for replicating a delete file command for a replicated file, in accordance with an embodiment of the present invention.

Refer now to the example embodiments of FIGS. 3 and 7, which illustrate an example embodiment of replicating a file delete command. A file delete command is received (step 702). A determination is made if the file is being replicated (step 722). If the file is being replicated, the splitter sends the delete command to the local replication appliance. The command is send to the remote replication appliance (step 734). The command is written to the journal (step 746). When applying the delete command from the replica journal to the file system, the data of the deleted file is copied to the undo journal, then a create file command is written to the undo journal. (step 758), the file may be marked as a removed file in the consistency group and may delete from the file system, it may be removed from the consistency group when the undo data containing the file data is erased from the undo stream.

Figure 8:
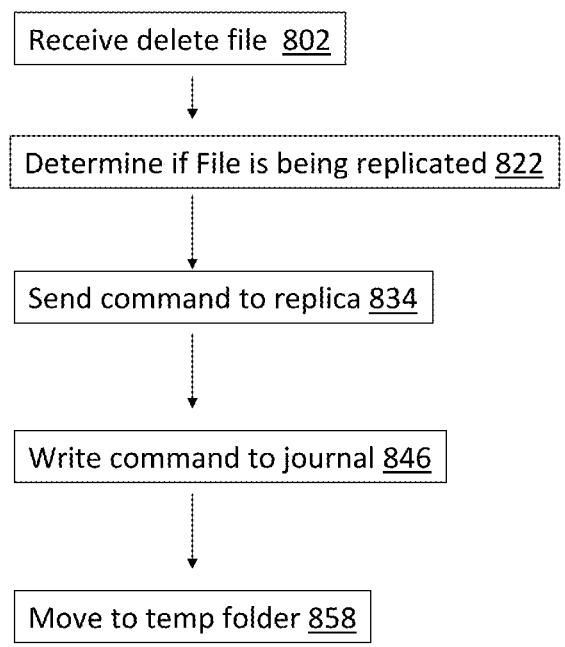
FIG. 8 is an alternative example of an embodiment of a for replicating a delete file command for a replicated file, in accordance with an embodiment of the present invention.

Refer now to the example embodiments of FIGS. 3 and 8, which illustrate an alternative embodiment of deleting a file. A file delete command is received (step 802). A determination is made if the file is being replicated (step 822). If the file is being replicated, the splitter sends the file to the local replication appliance. The command is send to the remote replication appliance (step 834). The command is written to the journal (step 846). When the command is to be applied to the file, the deleted file is moved to a temporary folder (step 858). In certain embodiments, the file may be marked as a removed file in the consistency group.

In most embodiments, an undo of the delete command, i.e. a command to move the file from the temporary directory back to its original location may be tracked in the undo journal. In certain embodiments, the file may be permanently deleted from the file system and may be removed from the consistency group when the undo command for deleting the file (i.e. moving it back from the temporary folder back to its original location) is deleted from the undo journal. In certain embodiments, the data of the undo journal may be erased in one of two cases: the undo stream size is beyond a particular or the temporary directory is beyond a specified size. In these embodiments, data may be deleted from the undo stream and the file may be indicated in the undo stream as erased and erased from the journal.

Figure 9:
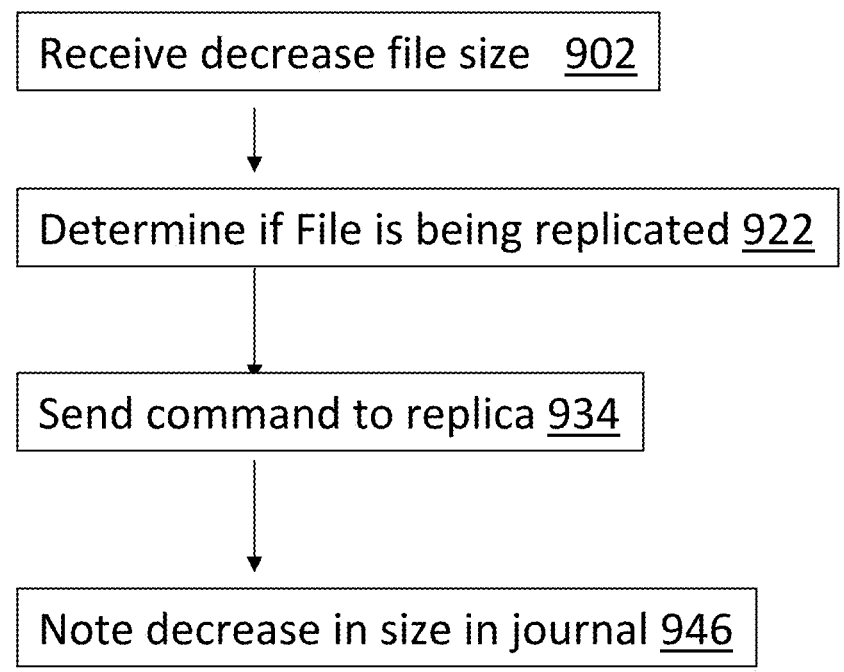
FIG. 9 is an example of an embodiment of a method for replicating a decrease file size command for a replicated file, in accordance with an embodiment of the present invention.

Refer now to the example embodiments of FIGS. 3 and 9, which illustrate an embodiment of decreasing the size of a replicated file. A command is received to decrease the size of the file (step 902). A determination is made if the file is being replicated (step 922). If the command is being replicated the command is send to the replication site (step 934). A mark is made in the journal noting the decrease in size of the file (step 946).

In some embodiments, the file may be decreased in size, when the decrease size command is erased from the undo journal. In certain embodiments, the new file size may be the maximum size the file has in the journal. In most embodiments, when user tried to access a point in time, the splitter may expose the file in the size it was in the relevant point in time, which may be smaller than the file size on the disk if the file size decreased, this may be done by faking the response the file system calls when file size is queried.

Figure 10:
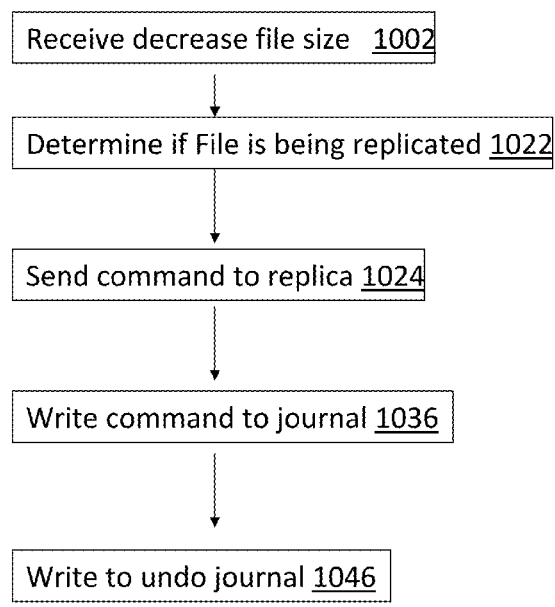
FIG. 10 is an example of an alternative embodiment of a method for replicating a decrease file size command for a replicated file, in accordance with an embodiment of the present invention.

Refer now to the example embodiments of FIGS. 3 and 10, which illustrate an alternative embodiment of decreasing the size of a replicated file. A command is received to decrease the size of the file (step 1002). A determination is made if the file is being replicated (step 1022). If the command is being replicated the command is send to the replication site (step 1024) and written to the redo journal (1036). The part of the file that is decreased is written into the undo journal (step 1046) and an increase file size command is tracked in the undo journal as well.

Figure 11:
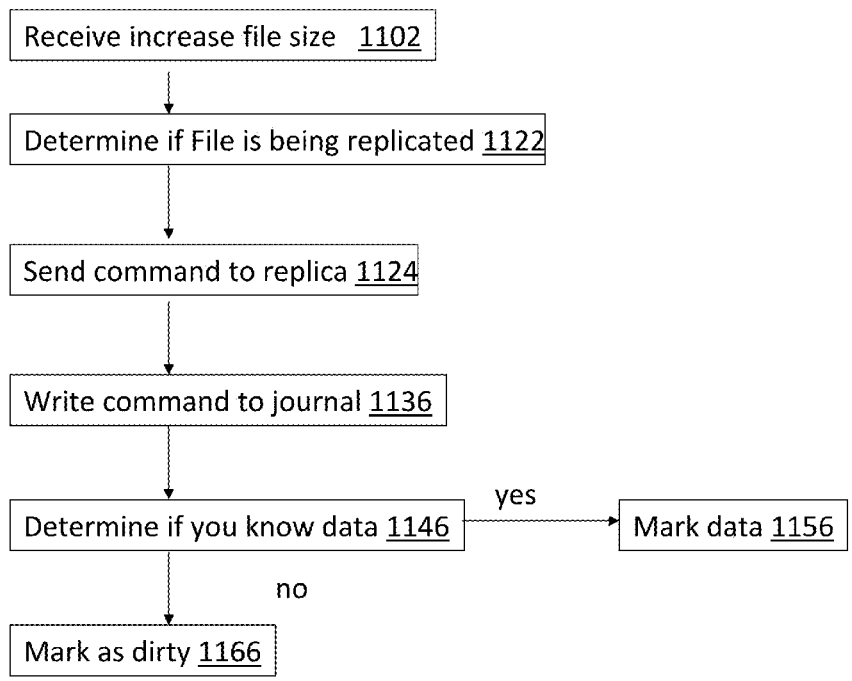
FIG. 11 is an example of an embodiment of a method for replicating an increase file size command for a replicated file, in accordance with an embodiment of the present invention.

Refer now to the example embodiments of FIGS. 3 and 11, which illustrate an embodiment of increasing the size of a replicated file. A command is received to increase the size of the file (step 1102). A determination is made if the file is being replicated (step 1122). If the command is being replicated the command is send to the replication site (step 1124) and written to the redo journal. A determination is made if the data in the increased portion of the file thinly provisioned (step 1146). If the data is thinly provisioned (step 1156), replication continues as the data on the replica may be identical when file size is increased. If the data is not thinly, the data is marked as dirty (step 1166), replication pauses and resumes and system will resynchronize the file's new data.

In some embodiments, for each file replicated the DPA may have a unique ID for that file. In most embodiments, when a write arrives to the file the splitter may put the file ID in the 3 most significant bytes of the CDB, and may place the write offset in the rest of the bytes. In certain embodiments, the write data may be in the payload of the write commands.

Refer now to the example embodiment of FIG. 12. FIG. 12 illustrates a sample header of a SCSI WRITE(16) command. In most embodiments, the 3 bytes of LBA may be taken for file ID, which may limit the file size to be 256 TB. In certain embodiments, a DPA may expose a LUN through which the splitter is communicating. In some of these embodiments, a write to a file may be a SCSI write command to the LU the DPA exposes. In most of these embodiments, it may have a write header similar to that of FIG. 12. In certain embodiments, the file may be written in bytes 2,3,4 and the offset may be in bytes 5-9.

In most embodiments, control commands may be written to ID 0 of the SCSCI write, an embodiment of which is shown in FIG. 12. In certain embodiments, the payload of the write may include the ID of the file and the command metadata (such as delete, ID x). In some embodiments, the create protocol may send a create command and the name of the file created and a new unique ID. In these embodiments, the DPA may assigned the ID with the filename and may start accepting new IO commands for the specific file with the new unique ID.

In other embodiments, a truncate command may be a SCSI_WRITE16 to offset 0 (the control offset), with size of 1 block and data may be TRUNCATE FILEID and the new file size. In certain embodiments, a write to file ID x to offset y of size z may be SCSI_WRITE16 to offset x:y where the size is z and the data in the payload is the write data. In these embodiments, where x:y may be an 8 byte number where the 3 high bytes may be the file id and the 5 low bytes are the offset.

In some embodiments, it maybe determined that a received IO is a command to increase a file size it may be determined if the data that is increased is known, and based on a determination that the increased data is known, the increased data may be written to the redo log, the increase command may be read from the redo log; the file size may be increased, and a decrease size command may be tracked in the undo log.

In other embodiments, changes made to replicated file may be tracked if replication stops due to a problem, the changes made during the fault at the production appliance may be read, the changes may be sent to the replica appliance. In further embodiments, the protection appliance may be read as a set of processes or a virtual machine.

Figure 13:
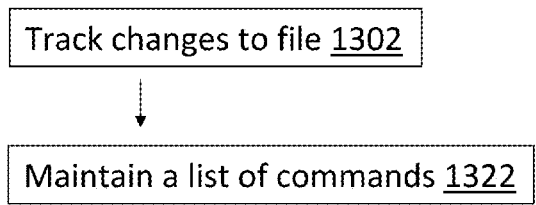
FIG. 13 is an example of an embodiment of a method tracking changes to a replicated file, in accordance with an embodiment of the present invention.

Initialization:

In some embodiments, the DPA may crash or the replication may stop and this may require the replication be re-initialized. In most embodiments, when the replication is stopped, the splitter may track the changes to each file. In certain embodiments, the splitter may maintain a list of commands that have been sent to each file. In certain embodiments, the splitter may only track the metadata corresponding to the changes. For example refer to the example embodiments of FIGS. 2 and 13. Splitter 314 tracks changes(step 1302). Splitter 314 maintains commands (step 1322).

In further embodiments, if the metadata for each file is too large to track, the splitter may use a bitmap for the file to mark the changes. In still further embodiments, the splitter may also use a control bit to denote any control commands that are received for the file. In some embodiments, a bitmap may be a matrix of Booleans values, where each Boolean maps to a change of a particular portion of the file. In further embodiments, each file may be associated with a change bitmap In a particular embodiment, if the splitter receives a command to increase the file size, the control bit may be used and the new portion of the file may be marked as dirty in the bitmap. In another embodiment, if a delete command is received, the bitmap may be zeroed and the control bit may be triggered. In a further embodiment, if a file creation command is received, a new bitmap may be created and the control bit may be triggered.

Figure 14:
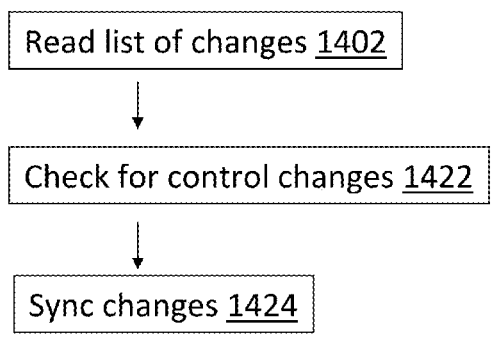
FIG. 14 is an example of an embodiment of a method for synchronizing changes to a replicated file, in accordance with an embodiment of the present invention.

In certain embodiments, once replication has been restored and the DPA is back up, the DPA may read the list of changes from the splitter, and will check for control changes to files (e.g. create/delete/etc). In most embodiments, the DPA may read the dirty location in the bitmap and may sync these locations to the replica site. For example, refer to the example embodiments of FIGS. 2 and 14. DPA may read the changes from a bitmap (step 1402). DPA may also check for control changes such as a file being deleted or enlarged (step 1422). The DPA may synchronize the changes from site 305 to site 337(step 1424).

In further embodiments, if the WAN is down but the DPA is active, the DPA may track the changes to the files arriving from the splitter in a delta marker stream. In most embodiments, the delta marking stream may have a finer granularity than the bitmaps in the splitter memory. In further embodiments, once communication is active, the changes tracked at the splitter may be merged to the changes in the delta marking stream of the DPA and initialization may be performed from the change set in the delta marking stream.

Figure 15:
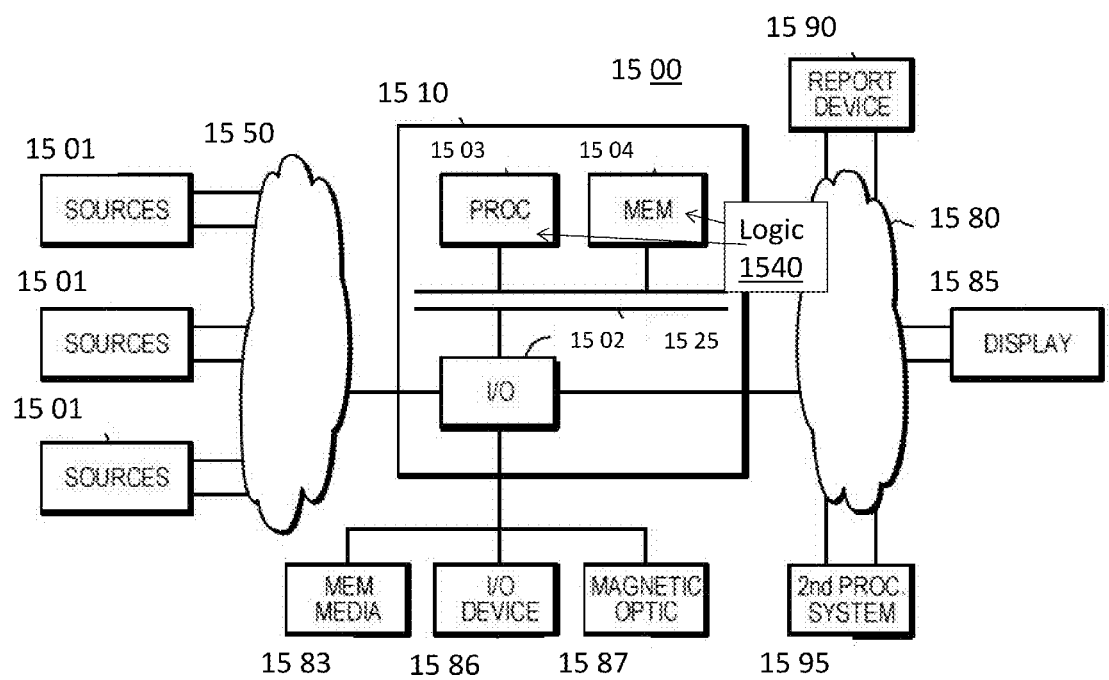
FIG. 15 is an example of an embodiment of an apparatus that may utilize the techniques described herein, in accordance with an embodiment of the present disclosure.
Figure 16:
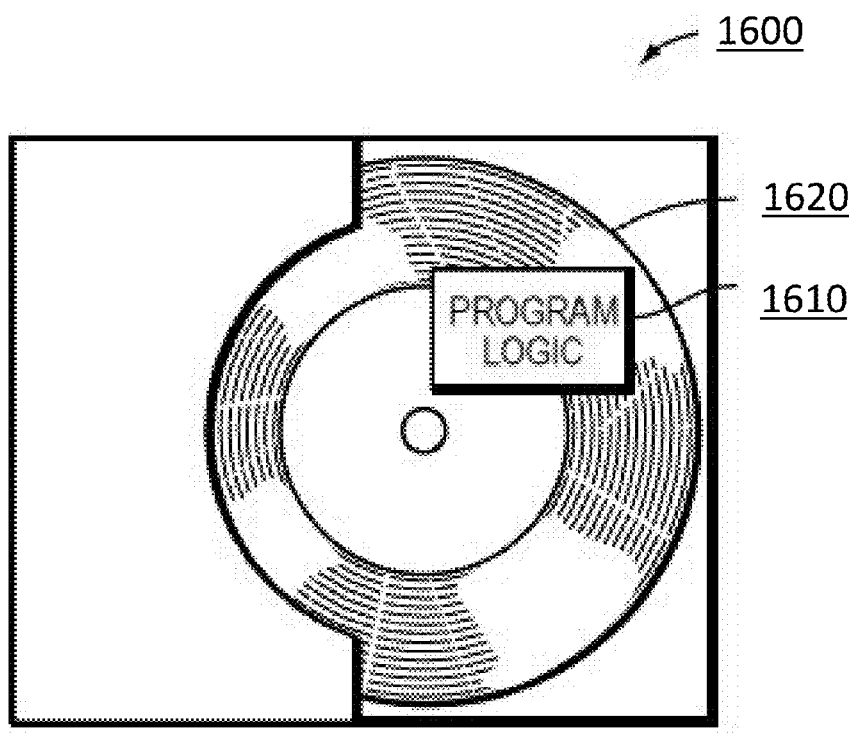
FIG. 16 is an example of an embodiment of a method embodied on a computer readable storage medium that may utilize the techniques described herein, in accordance with an embodiment of the present invention.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 15, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 16 shows Program Logic 1610 embodied on a computer-readable medium 1630 as shown, and wherein the Logic is encoded in computer-executable code configured for carrying out the reservation service process of this invention and thereby forming a Computer Program Product 1600. Logic 1540 of FIG. 15 may be loaded into memory 1504 and executed by processor 1630. Logic 1540 may also be the same logic 1610 on computer readable medium 1630.

The logic for carrying out the method may be embodied as part of the aforementioned system, which is useful for carrying out a method described with reference to embodiments shown in, for example, FIG. 3 and FIG. 4. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer program product for use in replication comprising:
   a non-transitory computer readable medium encoded with computer executable program code for replication of data, the code configured to enable the execution of:
   intercepting an Input/Output (IO) for a file at an application layer at the production site at a splitter;
   determining at the splitter whether the IO is a command that corresponds to a file to be replicated, wherein the determining whether the IO corresponds to a command includes examining the IO for a file ID;

based on a determination the file is being replicated, sending the IO to a first data recovery appliance (DPA);
recording the IO corresponding to the file in a journal;
reading the IO from the journal;
creating an UNDO for the IO;
applying the data to the file;
determining that the IO corresponds to a command to decrease a file size;
noting the file size should be increased to the original in the undo;
moving decreased data into the undo journal; and
decreasing the file size.

2. The code of claim 1, further enabled for execution of:
sending the IO from the first data recovery appliance to a second data recovery appliance; and
sending the IO to a target on the production site.

3. The code of claim 1, further enabled for execution of:
determining that the IO corresponds to a command to create a file;
adding the file to a consistency group;
notifying the splitter to split the IO for the file; and
creating the file at the replication site.

4. The code of claim 1, further enabled for execution of:
determining that the IO corresponds to a command to delete a file;
copying the data in the file to an undo journal;
adding a create file to the undo journal; and
deleting the file.

5. The code of claim 1, further enabled for execution of:
determining that the IO corresponds to a command to delete a file;
moving the file to a temporary directory; and
noting moved file's temporary location in the undo journal.

6. The code of claim 1, further enabled for execution of:
determining that the IO corresponds to a command to increase a file size;
determining if the increased data is known; and
based on a negative determination, pausing replication and marking a unknown area in a delta marker stream and resuming replication and re-synchronizing the data.

7. A computer implemented method of ordering data IO captured at a primary site to be applied at a secondary site, comprising:
intercepting an Input/Output (IO) for a file at an application layer at the production site at a splitter;
determining at the splitter whether the IO is a command that corresponds to a file to be replicated, wherein the determining whether the IO corresponds to a command includes examining the IO for a file ID;
based on a determination the file is being replicated, sending the IO to a first data recovery appliance (DPA);
recording the IO corresponding to the file in a journal;
reading the IO from the journal;
creating an UNDO for the IO;
applying the data to the file;
determining that the IO corresponds to a command to decrease a file size;
noting the file size should be increased to the original in the undo;
moving decreased data into the undo journal; and
decreasing the file size.

8. The method of claim 7, further comprising:
sending the IO from the first data recovery appliance to a second data recovery appliance; and
sending the IO to a target on the production site.

9. The method of claim 7, further comprising:
determining that the IO corresponds to a command to create a file;
adding the file to a consistency group;
notifying the splitter to split the IO for the file; and
creating the file at the replication site.

10. The method of claim 7, further comprising:
determining that the IO corresponds to a command to delete a file;
copying the data in the file to an undo journal;
adding a create file to the undo journal; and
deleting the file.

11. A system for data protection, the system comprising:
a production site, the production site comprising a logical storage medium;
a replication site, the replication site comprising a logical storage medium;
a first data protection appliance; and computer-executable logic operating in memory, wherein the computer-executable program logic is configured for execution of:
intercepting an Input/Output (IO) for a file at an application layer at the production site at a splitter;
determining at the splitter whether the IO is a command that corresponds to a file to be replicated, wherein the determining whether the IO corresponds to a command includes examining the IO for a file ID;
based on a determination the file is being replicated, sending the IO to a first data recovery appliance (DPA);
recording the IO corresponding to the file in a journal;
reading the IO from the journal;
creating an UNDO for the IO;
applying the data to the file;
determining that the IO corresponds to a command to decrease a file size;
noting the file size should be increased to the original in the undo;
moving decreased data into the undo journal; and
decreasing the file size.

12. The system of claim 11, wherein the computer executable logic is further configured for execution of:
sending the IO from the first data recovery appliance to a second data recovery appliance; and
sending the IO to a target on the production site.

13. The system of claim 11, wherein the computer executable logic is further configured for execution of:
determining that the IO corresponds to a command to create a file;
adding the file to a consistency group;
notifying the splitter to split the IO for the file; and
creating the file at the replication site.

14. The system of claim 11, wherein the computer executable logic is further configured for execution of:
determining that the IO corresponds to a command to delete a file;
copying the data in the file to an undo journal;
adding a create file to the undo journal; and
deleting the file.

* * * * *